US009175969B2

(12) United States Patent
Xie et al.

(10) Patent No.: US 9,175,969 B2
(45) Date of Patent: Nov. 3, 2015

(54) PROACTIVE NAVIGATION TECHNIQUES TO IMPROVE USERS' MOBILE NETWORK ACCESS

(75) Inventors: Haiyong Xie, Union City, CA (US); Cong Shi, Atlanta, GA (US); Guangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 581 days.

(21) Appl. No.: 13/544,592

(22) Filed: Jul. 9, 2012

(65) Prior Publication Data
US 2013/0024107 A1 Jan. 24, 2013

Related U.S. Application Data

(60) Provisional application No. 61/509,824, filed on Jul. 20, 2011.

(51) Int. Cl.
*G01C 21/34* (2006.01)
*H04W 4/02* (2009.01)
*H04W 48/18* (2009.01)

(52) U.S. Cl.
CPC ........ *G01C 21/3461* (2013.01); *G01C 21/3415* (2013.01); *H04W 4/02* (2013.01); *G01C 21/343* (2013.01); *H04W 48/18* (2013.01)

(58) Field of Classification Search
CPC .................................................. H04L 43/087
See application file for complete search history.

(56) References Cited

U.S. PATENT DOCUMENTS

| | | | |
|---|---|---|---|
| 2003/0060973 A1* | 3/2003 | Mathews et al. | 701/209 |
| 2007/0078597 A1 | 4/2007 | Kotzin | |
| 2009/0005097 A1* | 1/2009 | Shaffer et al. | 455/517 |
| 2010/0036604 A1 | 2/2010 | O'Connell et al. | |
| 2010/0088025 A1* | 4/2010 | Garg et al. | 701/209 |
| 2014/0286343 A1* | 9/2014 | Sung et al. | 370/400 |

FOREIGN PATENT DOCUMENTS

| | | |
|---|---|---|
| CN | 101039475 A | 9/2007 |
| CN | 101275856 A | 10/2008 |

(Continued)

OTHER PUBLICATIONS

Foreign Communication From A Related Counterpart Application, International Application No. PCT/CN2012/078981, International Search Report dated Oct. 25, 2012, 3 pages.

(Continued)

*Primary Examiner* — Tuan C. To
*Assistant Examiner* — Paul Castro
(74) *Attorney, Agent, or Firm* — Conley Rose, P.C.; Grant Rodolph; Brandt D. Howell

(57) ABSTRACT

A method for determining a path for a user of a mobile device for traveling from an origination location to a destination location, comprising receiving a request for a recommended path from the origination location to the destination location, wherein the request comprises a origination location, a destination location, and a network quality constraint, receiving network access point information for access points between the origination location and the destination location, and generating, with a processor, at least one recommended path from the origination location to the destination location based on the request and the network access point information, wherein the recommended path satisfies the network quality constraint.

9 Claims, 11 Drawing Sheets

(56) References Cited

FOREIGN PATENT DOCUMENTS

| CN | 101339042 A | 1/2009 |
|---|---|---|
| CN | 101409869 A | 4/2009 |
| CN | 101437193 A | 5/2009 |
| WO | 2009156554 A1 | 12/2009 |

OTHER PUBLICATIONS

Foreign Communication From A Related Counterpart Application, International Application No. PCT/CN2012/078981, Written Opinion dated Oct. 25, 2012, 7 pages.
Foreign Communication from A Counterpart Application, European Application No. 12814386.4, Extended European Search Report dated Apr. 23, 2014, 8 pages.
Akyildiz, Ian F., et al., "The Predictive User Mobility Profile Framework for Wireless Multimedia Networks," IEEE/ACM Transactions on Networking, vol. 12, No. 6, Dec. 2004, 15 pages.
Balasubramanian, Aruna, et al., "Augmenting Mobile 3G Using WiFi," Proceedings ACM MobiSys '10, Jun. 15-18, 2010, 13 pages.
Balasubramanian, Aruna, et al., "Interactive WiFi Connectivity for Moving Vehicles," Proceedings ACM SIGCOMM '08, Aug. 17-22, 2008, 12 pages.
Deshpande, Pralhad, et al., "Performance Comparison of 3G and Metro-Scale WiFi for Vehicular Network Access," Proceedings ACM ICM '10, Nov. 1-3, 2010, 7 pages.
Deshpande, Pralhad, et al., "Predictive Methods for Improved Vehicular WiFi Access," Proceedings ACM MobiSys '09, Jun. 22-25, 2009, 14 pages.
Hadaller, David, et al., "Vehicular Opportunistic Communication Under the Microscope," Proceedings ACM MobiSys '07, Jun. 11-13, 2007, 14 pages.
Huang, Junxian, et al., "Anatomizing Application Performance Differences on Smartphones," Proceedings ACM MobiSys '10, Jun. 15-18, 2010, 13 pages.
Kim, Minkyong, et al., "Extracting A Mobility Model From Real User Traces," Proceedings 25th International Conference on Computer Communications, INFOCOM 2006, Apr. 2006, 13 pages.
Kuipers, Fernando, et al., "An Overview of Constraint-Based Path Selection Algorithms for QoS Routing," IP-Oriented Quality of Service, IEEE Communications Magazine, Dec. 2002, 6 pages.
Lee, Kyunghan, et al., "Mobile Data Offloading: How Much Can WiFi Deliver?," Proceedings ACM CoNEXT 2010, Nov. 30-Dec. 3, 2010, 12 pages.
Lee, Youngseok, et al., "Measured TCP Performance in CDMA 1x EV-DO Network," 2005, 10 pages.
Li, Qun, et al., "Sending Messages to Mobile Users in Disconnected Ad-hoc Wireless Networks," ACM MobiCom, 2000, 13 pages.
Liu, Gang, et al., "A *Prune: An Algorithm for Finding K Shortest Paths Subject to Multiple Constraints," IEEE INFOCOM, 2001, 7 pages.
Mattar, Karim, et al., "TCP Over CDMA2000 Networks: A Cross-Layer Measurement Study," Proceedings of the 8th International Conference on Passive and Active Network Measurement, PAM '07, 11 pages.
De Neve, Hans, et al., "TAMCRA: A Tunable Accuracy Multiple Constraints Routing Algorithm," Computer Communications, vol. 23, Issue 7, Mar. 13, 2000, pp. 667-679.
Nicholson, Anthony J., et al., "BreadCrumbs: Forecasting Mobile Connectivity," Proceedings ACM MobiCom '08, Sep. 14-19, 2008, 12 pages.
Zhao, Wenrui, et al., "A Message Ferrying Approach for Data Delivery in Sparse Mobile Ad Hoc Networks," Proceedings ACM MobiHoc '04, May 24-26, 2004, 12 pages.
Jaffe, Jeffrey M., "Algorithms for Finding Paths with Multiple Constraints," Networks, vol. 14, 1984, pp. 95-116.
Garey, Michael R., et al., "Computers and Intractability: A Guide to the Theory of NP-Completeness," Bell Laboratories, Incorporated, 1979, 354 pages.

\* cited by examiner

SUBURB IN SANTA CLARA, CA

SAN JOSE DOWNTOWN, CA

SOUTH BAY AREA, CA

PROACTIVE NAVIGATION TECHNIQUES TO IMPROVE USERS' MOBILE NETWORK ACCESS

CROSS-REFERENCE TO RELATED APPLICATIONS

The present application claims the benefit of U.S. Provisional Patent Application No. 61/509,824 filed Jul. 20, 2011 by Haiyong Xie, et al. and entitled "Proactive Navigation Techniques to Improve Users' Mobile Network Access," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The wide deployment of infrastructure based mobile networks, e.g., high-speed cellular networks and metro-scale WiFi™ (WiFi™ is an wireless local area network (WLAN) based on the Institute of Electrical and electronics Engineers (IEEE) 802.11 standards), significantly facilitates the ubiquitous Internet access for mobile users. It is becoming a common practice for users on the move to use many kinds of Internet services like browsing, video streaming, and even video chat. Meanwhile these mobile applications have various requirements on the mobile networks, e.g., high availability, high bandwidth, and low loss rate. Unfortunately, current deployed mobile networks cannot satisfy these requirements everywhere because of the imbalanced distribution of base stations (or access points for WiFi™) and the geographic properties of different regions. Mobile users usually experience varying network quality during their movement. The varying network quality may be caused by the combined effects of imbalanced geographic distribution of mobile networks and users' lacking and, thus, ignoring such information when choosing the travel paths.

SUMMARY

In one embodiment, the disclosure includes a method for determining a path for a user of a mobile device for traveling from an origination location to a destination location, comprising receiving a request for a recommended path from the origination location to the destination location, wherein the request comprises a origination location, a destination location, and a network quality constraint, receiving network access point information for access points between the origination location and the destination location, and generating, with a processor, at least one recommended path from the origination location to the destination location based on the request and the network access point information, wherein the recommended path satisfies the network quality constraint.

In another embodiment, the disclosure includes an apparatus for generating at least one recommended path for a user of a mobile device to travel from an origination point to a destination point, comprising an interface configured to receive a request for a recommended path from a user, wherein the request comprises the origination point, the destination point, and a user constraint, a receiver configured to receive network accessibility information, and a processor coupled to the interface and the receiver and configured to determine the at least one recommended path based on the user constraint and the network accessibility information.

In another embodiment, the disclosure includes a system for generating at least one recommended path for a user of a mobile device to travel from an origination point to a destination point, comprising a user interface configured to receive a request for a recommended path from a user, wherein the request comprises the origination point, the destination point, and a constraint, a receiver configured to receive network accessibility information, and a processor configured to determine the at least one recommended path based on the constraint and the network accessibility information.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
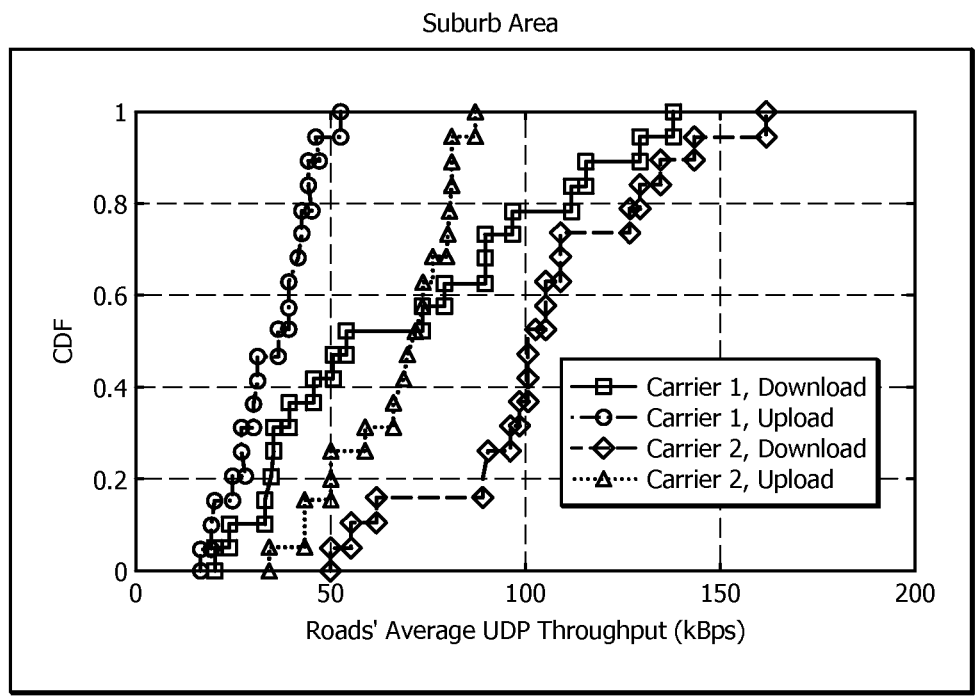
FIGS. 1-6 show performance data for different regions of a metropolitan area indicating upload and download throughput for two different carriers by road.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for network-oriented navigation. In an embodiment, a network optimizer receives a request from a user for a recommended path from an origination to a destination. The request may include user constraints regarding travel time, travel distance, and network quality. The network optimizer obtains network quality information for network access points along different paths from the origination and the destination. The network optimizer may determine one or more recommended paths taking into account the network quality along each of the paths. The recommended path(s) may be longer or slightly longer than a shortest path or take more time than a quickest path, but may provide improved network accessibility and/or quality to the user. The user may be willing to sacrifice a little travel distance or travel time in exchange for significantly improved network accessibility and/or quality.

Despite the wide deployment of infrastructure based mobile networks, mobile users still experience varying network quality. The varying degree of network quality may be caused by the combined effects of the imbalanced geographic coverage of mobile networks and users' lacking and, thus, ignoring, such information when choosing their travel paths. In this disclosure, a novel scheme of network oriented navigation for mobile users to improve their network access during travel is provided. Network oriented navigation may achieve this by associating the physical road map with mobile network performance and using it to find the travel paths satisfying user needs on both network quality and travel distance. Through evaluations of two major cellular networks on three maps of different scales and locations, it can be shown that network oriented navigation can significantly improve user network access at low cost, increasing the average downloading throughput during the travel by as large as 193.8% with only 3% extra travel distance in some cases. These results, although preliminary, demonstrate the great potential of improving network access quality for mobile users, without changing network infrastructure or mobile applications.

The wide deployment of infrastructure based mobile networks, e.g., high-speed cellular networks and metroscale WiFi, significantly facilitates the ubiquitous Internet access for mobile users. It is becoming a common practice for users on the move to use many kinds of Internet services like browsing, video streaming, and even video chat. Meanwhile these mobile applications have various requirements on the mobile networks, e.g., high availability, high bandwidth, and low loss rate. Unfortunately, current deployed mobile networks cannot satisfy these requirements everywhere because of the imbalanced distribution of base stations (or access points for WiFi) and the geographic properties of different regions. Mobile users usually experience varying network quality during their movement. Recent studies show that even in metropolises, high-speed cellular networks and WiFi are not always available everywhere.

In this disclosure, an important class of user movement that only source, destination and the moving distance matter while the path can be changed is identified. It includes all the scenarios that GPS navigators are used. For this kind of movement a new mobile service is provided, i:e., network-oriented navigation, that supervises user movement according to user needs on the network quality as well as the distance constraint. The specific case that users move on a road map with a high-speed cellular network deployed is studied because of its typicalness. The fundamental idea behind network-oriented navigation is that there probably exist multiple paths between a pair of source and destination with similar length, but different network quality. This service helps users trade off a little extra distance for better mobile network access and, thus, better utilization of their time on the road. It may benefit users in time uncritical scenarios, for example, a group of friends driving to a national park far away from the city want good network access to kill the time in the car. A mother picking up her children from the school during the rush hours wants her children to take some online exercises. This service may also be useful in time critical scenarios, for example, a businessman taking a taxi from the office to the airport probably wants to be remotely accessible to his clients all the time, instead of being directly available for a little more time in the office and unavailable on the road. As another example, a couple hurrying to the theatre probably prefer choosing the movie by reading online reviews on their way, instead of spending a lot of time on it at home.

Figure 2:
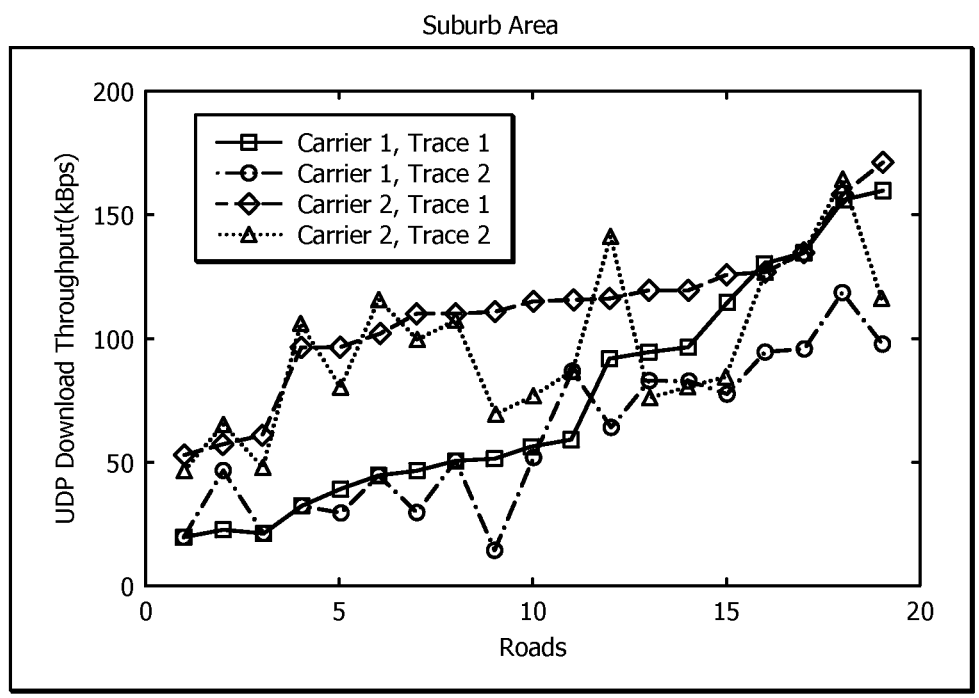
Figure 3:
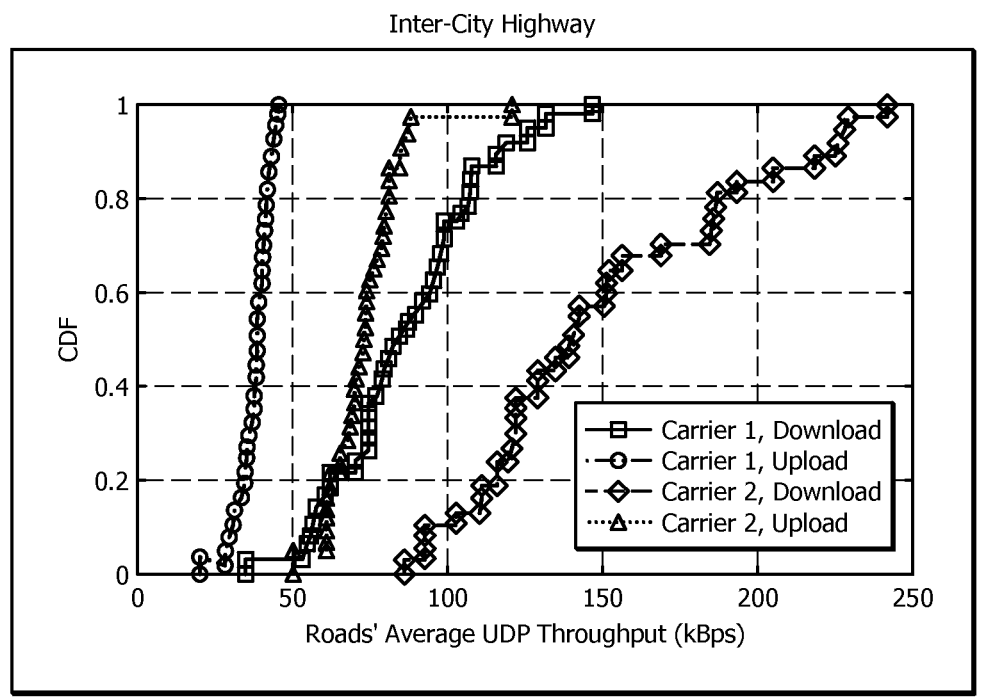
Figure 4:
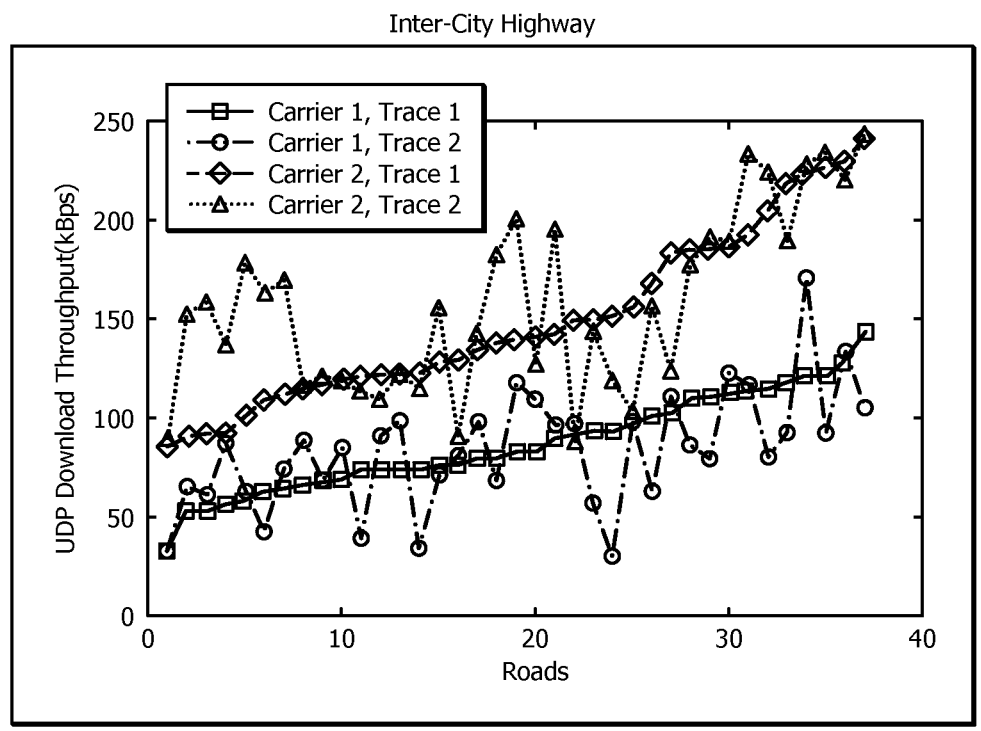
Figure 5:
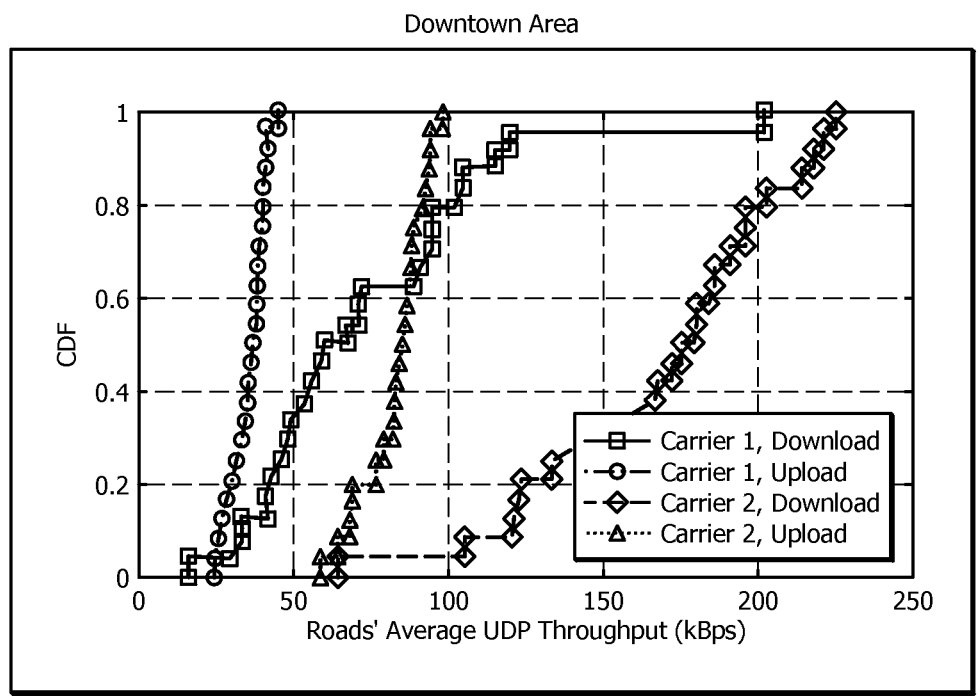
Figure 6:
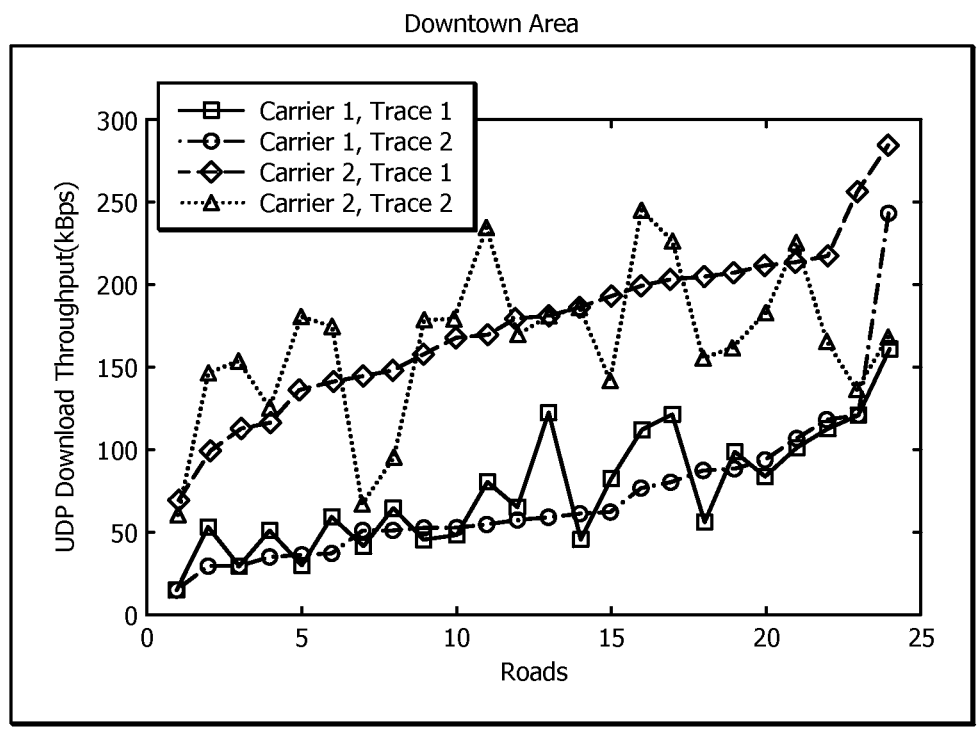

The feasibility of network-oriented navigation may depend on the predictability and geographic diversity of the network quality on all roads. The performance of two popular cellular networks on various road maps of different sizes and locations were collected and analyzed. FIGS. 1-6 shows performance data for different regions of a metropolitan area indicating upload and download throughput for two different carriers by road. FIGS. 1, 3, and 5 show the cumulative distribution function (CDF) for each carrier tested for upload and download versus the roads' average User Datagram Protocol (UDP) throughput for a suburban area, an inter-city highway area and a downtown area respectively. FIGS. 2, 4, and 6 show the UDP download throughput for each of two carriers versus roads for a suburban area, an inter-city highway area and a downtown area respectively. The results, shown in FIGS. 1-6, verify that the network performance may be stable for a specific location but may be quite diverse for different locations, indicating the potential of the disclosed apparatus, system, and method. It may be further formulated as an optimization problem and an algorithm is proposed for it. The preliminary evaluation on the data traces demonstrates the effectiveness of network-oriented navigation.

Figure 7:
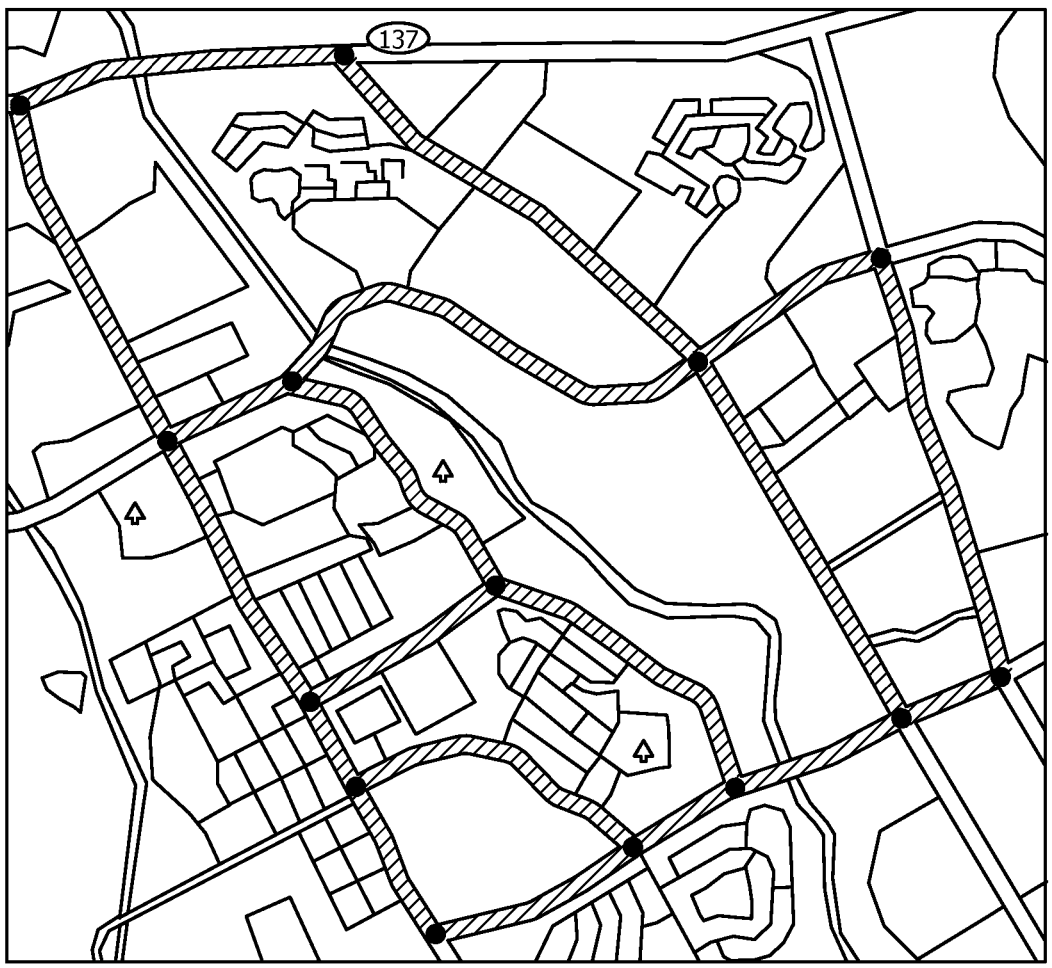
FIGS. 7, 8, and 9 show three physical maps, one residential area, one commercial area, and one metro area with multiple heavy-traffic highways.
Figure 8:
Figure 9:
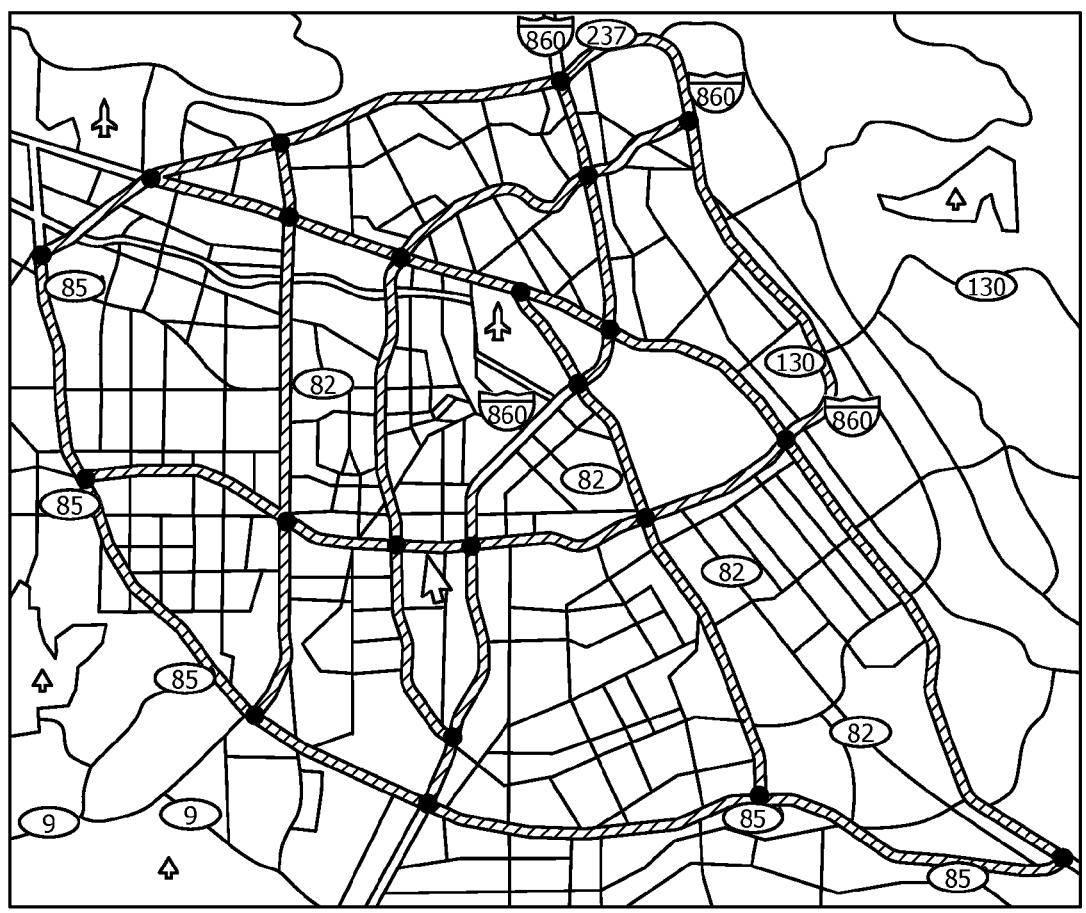

FIGS. 7, 8, and 9 show three physical maps, one residential area, one commercial area, and one metro area, respectively, with multiple heavy-traffic highways. The first two maps, FIGS. 7 and 8, cover regions within walking distances (a couple of miles), while the last map, FIG. 9, covers an approximately 10 times larger region within driving distances (tens of miles). FIGS. 7, 8, and 9 show the road maps where the performance of cellular networks was measured. The dark thick lines are the roads on which data was collected. FIG. 7 was collected by riding a bicycle; FIGS. 8 and 9 were collected by driving a vehicle. The data depicted in FIGS. 1 and 2 were collected in the area shown in FIG. 7. The data shown in FIGS. 3 and 4 were collected in the area shown in FIG. 9. The data shown in FIGS. 5 and 6 were collected in the area shown in FIG. 8.

With navigation for better network access, mobile users can choose detour routes (which may include a small percentage increase in the overall length of paths taken between origin and destination) and may significantly improve the quality of mobile network access.

Figure 10:
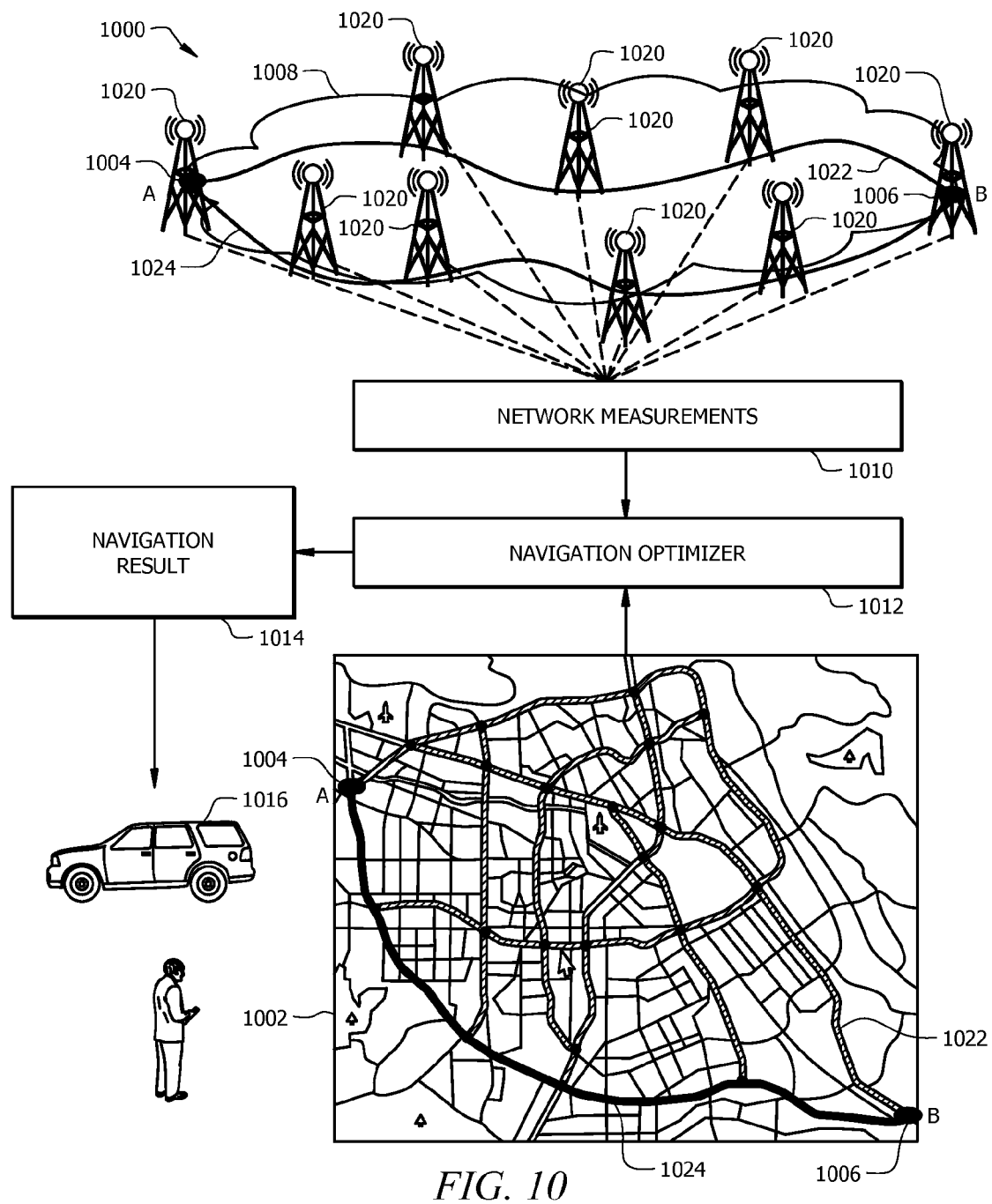
FIG. 10 is a pictorial diagram illustrating a system for determining a recommended path for a user to take between an origination location and a destination location that considers network quality in making the determination according to an embodiment.

Turning now to FIG. 10, a pictorial diagram illustrating a system 1000 for determining a recommended path for a user to take between an origination location and a destination location that considers network quality in making the determination is depicted in accordance with an embodiment. System 1000 includes a network 1008, a network measurements component 1010, and a navigation optimizer 1012. The network 1008 may include a plurality of network access points 1020 (e.g., base stations, WiFi access points, etc.).

The navigation optimizer 1012 may be configured to receive, through a user interface (not shown), a request from a user 1016 for a recommended path (or paths) from an origination 1004 to a destination 1006 that also meets a certain level of network quality along the path(s) or that results in a substantially minimized amount of inferior network availability or network performance. The request may include a user constraint related to network quality. The user constraint may include a limitation or maximum amount by which a travel distance for a recommended path or route may exceed a shortest travel distance. The user constraint may include a limitation or maximum amount by which a travel time for a recommended path or route may exceed a quickest travel time. The user constraint may include a specification of the minimum network quality that is desired.

Navigation optimizer 1012 may determine one or more paths 1022, 1024 from origination 1004 to destination 1006 and obtain, through a receiver or interface (not shown), network measurements 1010 from the network 1008 for each of the determined paths 1022, 1024. Measurements may be downloaded periodically or developed empirically by the phone recording measurements as it travels through a region. Network optimizer 1012 may determine one or more recommended paths from the one or more paths 1022, 1024 where the one or more recommended paths may be paths whose network and path characteristics satisfy the user constraints provided in the request. Network optimizer 1012 provides the navigation result 1014 to the user 1016. The navigation result may be one or a plurality of recommended paths 1024 from an origination point 1004 to a destination point 1006 and may include a map 1002. In addition to the recommended path(s), network optimizer 1012 may also provide an indication of various network quality parameters associated with each recommended path. These network quality parameters may assist the user 1016 in selecting a path to use from the plurality of recommended paths. The network quality parameters may include, for example, average upload throughput, average download throughput, and network type (e.g., 3G, 4G, WiFi™, etc.).

User 1016 progression along the path can be tracked by a global positioning system (GPS) or base transmitter station (BTS) triangulation. As the user 1016 traverses a recommended path from the origination point 1004 to the destination point 1006, the navigation optimizer 1012 may continue to receive network measurements 1010 from the network 1008 and dynamically revise the recommended path(s) based on changing network measurements. Thus, the network optimizer 1012 may provide the user 1016 with an updated recommended path that takes advantage of revised network measurements 1010 to ensure that the user 1016 maintains adequate network quality during the course of their travels. For example, if a base station or other network access point along the recommended path becomes unavailable during the user's travel, the network optimizer 1012 may provide a new recommended path to reroute the user 1016 along a new path in order to maintain access to the network 1008.

In an embodiment, network optimizer 1012 may be implemented as a service on a server and provided to a mobile device (e.g., in the form of a mobile phone or tablet application). In an embodiment, network optimizer 1012 may be implemented on a mobile device.

Figure 11:
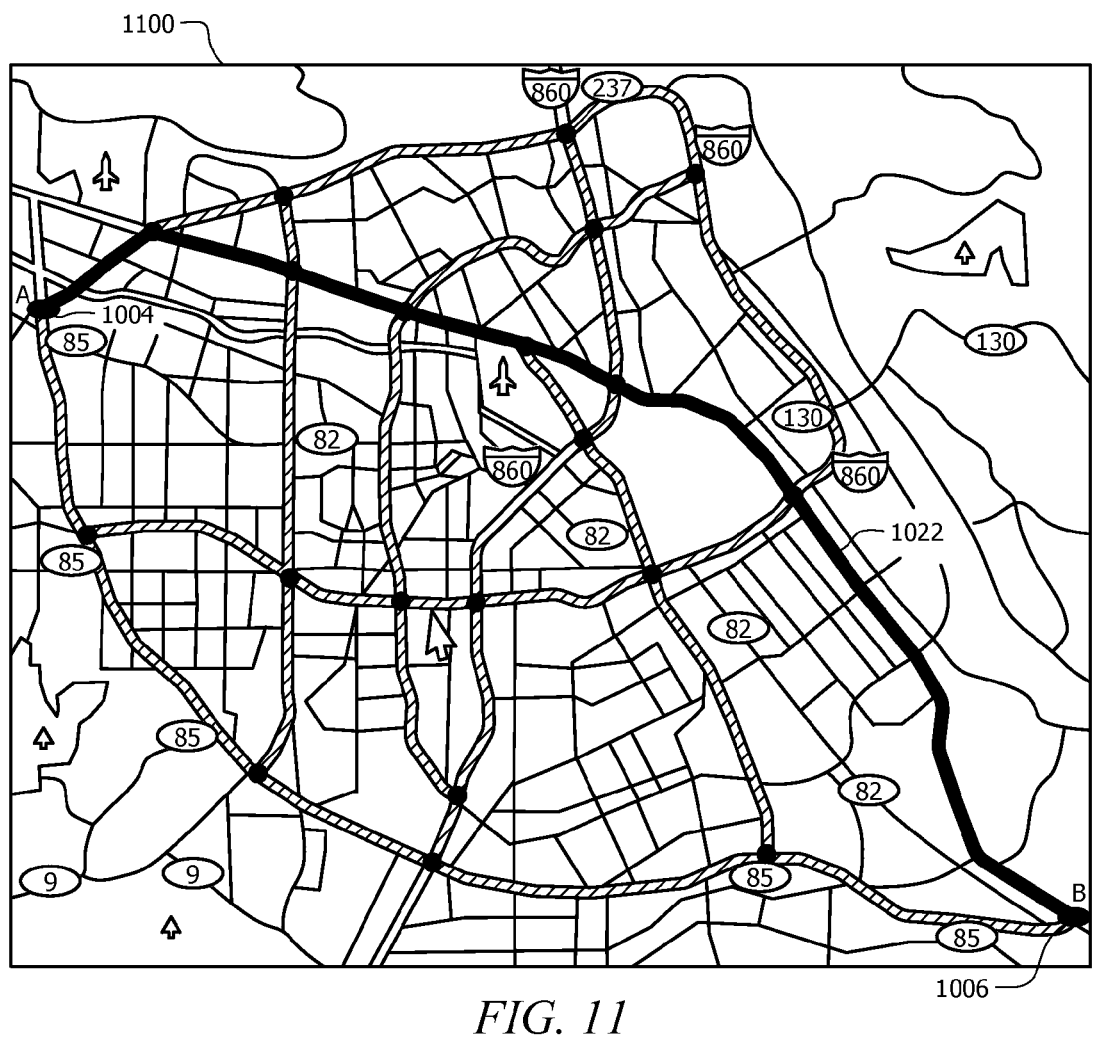
FIG. 11 shows a map showing a path from origination point to destination point that may be provided to a user by a system that does not take network quality into account when determining a path.
Figure 12:
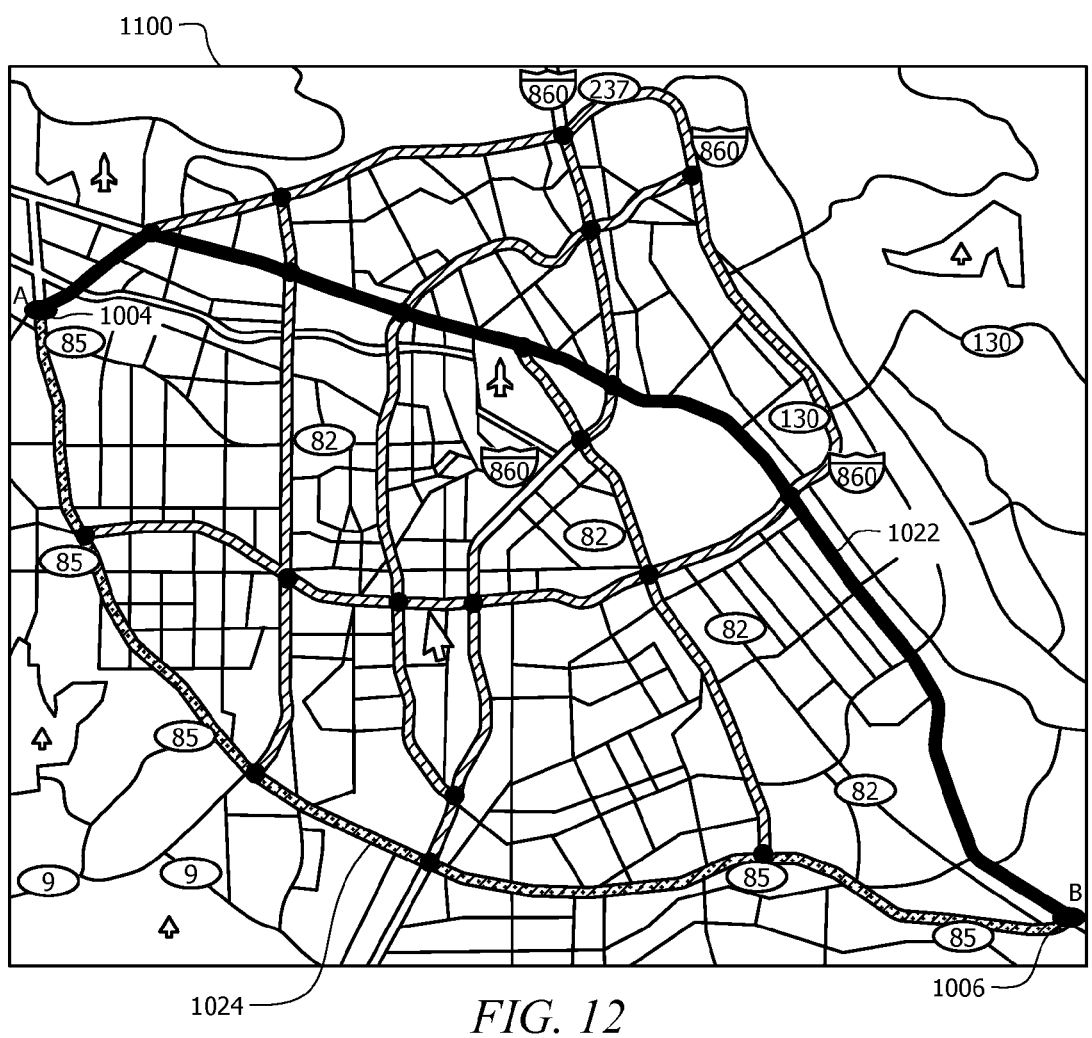
FIG. 12 shows map illustrating a recommended path that has been determined based network quality considerations according to an embodiment.

FIG. 11 shows a map 1100 showing a path 1022 from origination point 1004 to destination point 1006 that may be provided to a user by a system that does not take network quality into account when determining a path. FIG. 12 shows map 1100 illustrating a recommended path 1024 that has been determined based network quality considerations.

Figure 13:
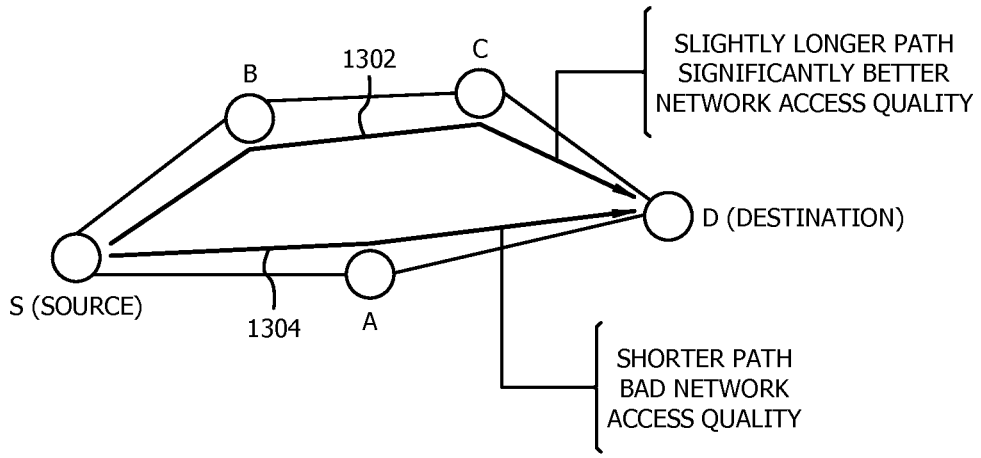
FIG. 13 is a schematic diagram illustrating network performance difference between two paths.

FIG. 13 is a schematic diagram illustrating network performance difference between two paths. The shortest path from the source S to the destination D is path 1304. However, path 1302, that is slightly longer than path 1304 has significantly better network access quality than path 1304. Thus, a user may prefer to use path 1302 over path 1304 in order to take advantage of the better network access quality.

Figure 14:
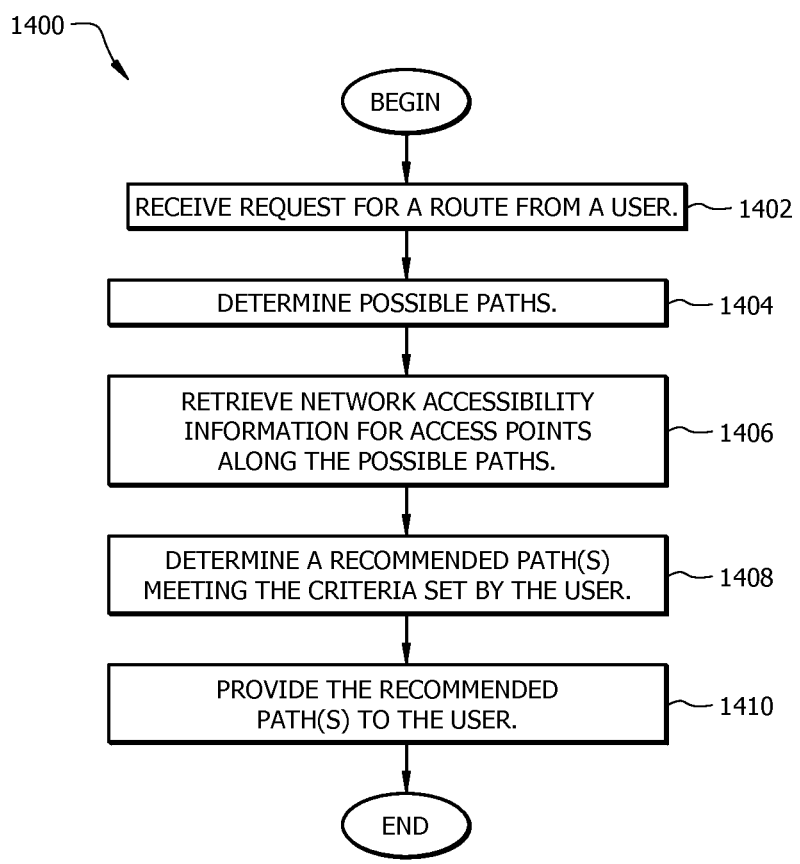
FIG. 14 is a flowchart illustrating a method for determining a recommended route with improved network availability for a user of a mobile device according to an embodiment.

Turning now to FIG. 14, a flowchart illustrating a method for determining a recommended route with improved network availability for a user of a mobile device is depicted in accordance with an embodiment. The method 1400 begins at block 1402 where the route computation element receives a request for a route from a user. The request may include an origination location, a destination location, and a user constraint. The user constraint may include a travel constraint and/or a network accessibility or network quality constraint. Examples of a travel constraint may include a maximum allowable travel distance, a maximum allowable travel delay, a maximum allowable gas consumption, a road type to avoid, a location to avoid, and a location to include on the recommended path. The travel constraint may be a maximum percentage increase in travel time from a shortest travel time between the origination location and the destination location. The travel constraint may be a maximum percentage increase in travel time from a shortest travel time that is acceptable for a minimum percentage increase in network performance. Examples of a network quality constraint may include a minimum allowable network bandwidth, a maximum allowable network latency, a maximum allowable packet loss rate, and a maximum allowable jitter. The user constraint may be an optimization condition or optimization objective. Examples of an optimization objective may include determining a path with one of a substantially maximized bandwidth, a substantially maximized time with a preferred connection type, a substantially minimized data packet loss rate, a substantially minimized network latency, a substantially minimized allowable jitter, a shortest travel distance, a quickest travel time, a substantially maximized use of a preferred road type, substantially minimized use of an undesirable road type, a specified desirable location that is included, and a specified undesirable location that is excluded.

At block 1404, the route computation element determines potential routes or paths between the origination location or point and the destination location or point. At block 1406, the route computation element obtains network accessibility or network quality information for wireless access points (e.g., base stations and WiFi access points) that are proximate to the potential routes. The network accessibility information or network quality information may include bandwidth, throughput, data packet loss rate, network latency, and jitter for each or a plurality of the wireless access points. The network accessibility information may be provided by a service provider that owns at least some of the wireless access points. At block 1408, the route computation element may determine a recommended path or a plurality of recommended paths between the origination location and the destination location that meets the requirements set by the user. The recommended path may not be the shortest path or the quickest path, but may be a path that is fractionally longer than the shortest path (or that takes a fractionally longer amount of time than the quickest path) that has increased network accessibility or network performance. If needed, traffic, constructions, and/or other delay information may be downloaded and use in determining the preferred path. At block 1410, the route computation element provides the recommended path or the plurality of recommended paths to the user after which the method 1400 may end.

Turning now to a problem formulation and solution for an exemplary algorithm for determining a recommended path with improved network quality, consider a roadmap G(N, E), where $u \in N$ is a vertex, and $<u, v> \in E$ is the directed road from vertex u to v. Let $L_{<u, v>}$ be the length of the road $<u, v>$.

Let $w_i$ be the $i^{th}$ weight which can be any network related metrics like bandwidth, loss rate, and latency. $w_{i,<u,v>}(x)$ represents the $i^{th}$ weight of the spot on the road $<u, v>$ whose distance to vertex u is x. Thus, $x \in [0, L_{<u,v>}]$.

Let $p^j_{<u1, uk>} = \{<u_1, u_2>, <u_2, u_3>, \ldots, <u_{k-1}, u_k>\}$ be an acyclic path from vertex $u_1$ to vertex $u_k$. $P_{<u1, uk>} = \{p^j_{<u1, uk>}\}$ is the set of all acyclic paths from $u_1$ to $u_k$. $p^*_{<u1, uk>} \in P_{<u1, uk>}$ annotates the shortest path. The length of path $pj_{<u1, uk>}$ is:

$$L_{p^j_{\langle u_1, u_k \rangle}} = \sum_{\langle u,v \rangle \in p^j_{\langle u_1, u_k \rangle}} L_{\langle u,v \rangle} \quad (3.1)$$

The $i^{th}$ weight of the spot whose distance to vertex $u_1$ along the path $p^j_{<u1, uk>}$ is x can be expressed as:

$$w_{i, p^j_{\langle u_1, u_k \rangle}}(x) = w_{i, \langle u_n, u_{n+1} \rangle} \left( x - \sum_{m=1}^{n-1} L_{\langle u_m, u_{m+1} \rangle} \right) \quad (3.2)$$

$$\text{if } x \in \left[ \sum_{m=1}^{n-1} L_{\langle u_m, u_{m+1} \rangle}, \sum_{m=1}^{n} L_{\langle u_m, u_{m+1} \rangle} \right]$$

where $<u_n, u_{n+1}> \in p^j_{<u1, uk>}$ (n=1, 2, ..., k-1) is the $n^{th}$ road along the path, $x \in [0, \Sigma_{m=1}^{k} L_{<u_m, u_{m+1}>}]$ Let $u_w(p)$ annotate a utility function of path p on weight w. One goal of network-oriented navigation service can be stated as finding a path to substantially optimize (substantially maximize or substantially minimize) the utility function under the constraint that the path length is within $1+\alpha$ of the shortest path, i.e., $$\text{Max } u_{wi}(p^j_{\langle u_1, u_k \rangle}) \quad (3.3)$$

$$\text{s.t. } p^j_{\langle u_1, u_k \rangle} \in P_{\langle u_1, u_k \rangle}$$

$$L_{p^j_{\langle u_1, u_k \rangle}} \leq (1+\alpha) \times L_{p^*_{\langle u_1, u_k \rangle}}$$

The utility function can be any arbitrary function to satisfy various requirements. For example, when $u_w(p)$ represents the average value of $w_i$, it can be expressed as:

$$u_{wi}(p^j_{\langle u_1, u_k \rangle}) = \frac{\int_0^{L_{p^j_{\langle u_1, u_k \rangle}}} |w_{i, p^j_{\langle u_1, u_k \rangle}}(x)| dx}{L_{p^j_{\langle u_1, u_k \rangle}}} \quad (3.4)$$

When $w_i$ is the downloading throughput, the selected path will be desirable for downloading large files. For applications that require continuous high throughput along the path, e.g., video chat, the utility function can be set as the t percentile value, i.e., $$u_{wi}(p^j_{\langle u_1, u_{k_L} \rangle}) = \max_v \left\{ \frac{\int_0^{p^j_{\langle u_1, u_k \rangle}} I(v - w_{i, p^j_{\langle u_1, u_k \rangle}}(x)) dx}{L_{p^j_{\langle u_1, u_k \rangle}}} \leq t \right\} \quad (3.5)$$

where I(x)=1 if x>0, otherwise I(x)=0. It means along a large portion (i.e., 1−t) of the path, user has high throughput.

Notice that $L_{<u,v>}$ can also be the duration that a user moves from u to v, which is more reasonable when different roads have different speed limits. In addition, those of ordinary skill in the art will recognize that it is easy to extend Equation 3.3 to incorporate multiple constraints on the network quality.

Finally, it is noteworthy that when the problem is simplified by making road weights be non-negative constants, i.e., $w_{i,<u,v>}(x) = C_{i,<u,v>}$, and the utility function be the sum of the road weights along the candidate path, i.e., $u_{wi}(pj_{<u1, uk>}) = \Sigma_{k-1\ i=1} C_{i,<ui, ui+1>}$, it is reduced to the restricted shortest path (RSP) problem which is still NP-complete. (See, F. Kuipers, P. Van Mieghem, T. Korkmaz, and M. Kranz. An overview of constraint-based path selection algorithms for qos routing. *IEEE Comm. Maga.*, 40, December 2002, which is incorporated herein by reference as if reproduced in its entirety). Similarly, when multiple constraints are considered, our algorithm is a generalized multi-constrained path (MCP) problem. Unfortunately, algorithms for RSP and MCP cannot be used for supervised movement because they rely on the accumulation of non-negative weights. A new algorithm, thus, may be required for network-oriented navigation, which will be described below.

Since the utility function is arbitrary, all candidate paths that satisfy the constraint should be explored to find the optimal path. A naive solution is to breadth-first search all acyclic paths from the source node to find the optimal path that satisfies the constraint. Since the number of paths grows exponentially with the network size, it may not be useful in practice.

Notice that during the breadth-first search process a candidate path consists of a path from the source to current node that has been explored, i.e., prefix, and one of those from current node to the destination, i.e., suffix. All paths starting with prefix are not shorter than that with prefix and the shortest suffix. Thus, if it does not satisfy the constraint, it is safe to stop exploring prefix. Algorithm 1 shows an example of pseudocode according to an embodiment.

---

Algorithm 1 Network Oriented Navigation

```
 1:  procedure NETNAVI(src,dst,α)
 2:    DstDijkstra(dst);      ▷ construct the shortest path tree
       from all nodes to dst.
 3:    threshold = α × src.distance2dst;
 4:    result = GetShortestPathToDst(src);
 5:    maxUtl = Utility(result);
 6:    p = new Path(src);     ▷ p.dst = src; p.length = 0.
 7:    queue.push(p);
 8:    while not queue.empty( ) do
 9:      p = queue.pop( );
10:      for each oe in p.dst.outgoingEdges do
11:        if (not p.contain(oe.dst)) && (p.length +
           oe.length + oe.dst.distance2dst ≤ threshold) then
12:          newPath = p.copy( ).append(oe);
13:          newPath.length + = oe.length;
14:          if oe.dst == dst && Utility(newPath) >
           maxUtl then
15:            maxUtl = Utility(newPath);
16:            result = newPath;
17:          else
18:            queue.add(newPath);
19:          end if
20:        end if
21:      end for
22:    end while
          return result;
23:  end procedure
```

---

First, a shortest path tree to the destination with function DstDijkstra( ) is constructed. It is very similar to a dijkstra algorithm, except that the outgoing edges are replaced by incoming edges. Then, a breadth-first search of all candidate acyclic paths is conducted until the distance constraint is violated. The function Utility can be any utility function of interest.

The algorithm complexity is proportional to the number of candidate paths satisfying the constraint. In the worst case it can still be exponential. However, when the number of candidate paths is small, it will be very efficient.

Figure 15:
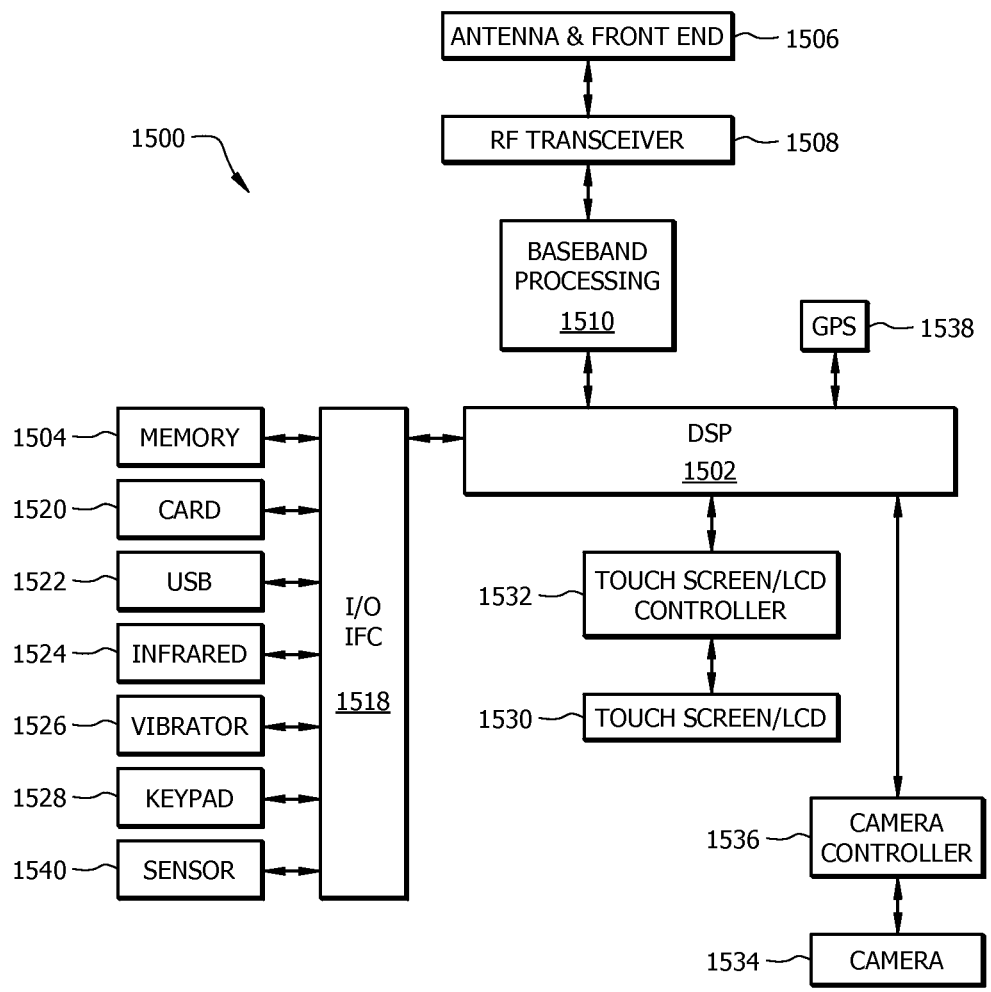
FIG. 15 shows a block diagram of a mobile device.

FIG. 15 shows a block diagram of the mobile device 1500. While a variety of known components of handsets are depicted, in an embodiment a subset of the listed components and/or additional components not listed may be included in the mobile device 1500. The mobile device 1500 includes a digital signal processor (DSP) 1502 and a memory 1504. As shown, the mobile device 1500 may further include an antenna and front end unit 1506, a radio frequency (RF) transceiver 1508, a baseband processing unit 1510, a microphone 1512, an earpiece speaker 1514, a headset port 1516, an input/output interface 1518, a removable memory card 1520, a universal serial bus (USB) port 1522, an infrared port 1524, a vibrator 1526, a keypad 1528, a touch screen liquid crystal display (LCD) with a touch sensitive surface 1530, a touch screen/LCD controller 1532, a camera 1534, a camera controller 1536, a global positioning system (GPS) receiver 1538, and a sensor 1540. In an embodiment, the mobile device 1500 may include another kind of display that does not provide a touch sensitive screen. In an embodiment, the DSP 1502 may communicate directly with the memory 1504 without passing through the input/output interface 1518. Additionally, in an embodiment, the mobile device 1500 may comprise other peripheral devices that provide other functionality.

The DSP 1502 or some other form of controller or central processing unit operates to control the various components of the mobile device 1500 in accordance with embedded software or firmware stored in memory 1504 or stored in memory contained within the DSP 1502 itself In addition to the embedded software or firmware, the DSP 1502 may execute other applications stored in the memory 1504 or made available via information carrier media such as portable data storage media like the removable memory card 1520 or via wired or wireless network communications. The application software may comprise a compiled set of machine-readable instructions that configure the DSP 1502 to provide the desired functionality, or the application software may be high-level software instructions to be processed by an interpreter or compiler to indirectly configure the DSP 1502.

The DSP 1502 may communicate with a wireless network via the analog baseband processing unit 1510. In some embodiments, the communication may provide Internet connectivity, enabling a user to gain access to content on the Internet and to send and receive e-mail or text messages. The input/output interface 1518 interconnects the DSP 1502 and various memories and interfaces. The memory 1504 and the removable memory card 1520 may provide software and data to configure the operation of the DSP 1502. Among the interfaces may be the USB port 1522 and the infrared port 1524. The USB port 1522 may enable the mobile device 1500 to function as a peripheral device to exchange information with a personal computer or other computer system. The infrared port 1524 and other optional ports such as a Bluetooth interface or an IEEE 802.11 compliant wireless interface may enable the mobile device 1500 to communicate wirelessly with other nearby handsets and/or wireless base stations.

The keypad 1528 couples to the DSP 1502 via the interface 1518 to provide one mechanism for the user to make selections, enter information, and otherwise provide input to the mobile device 1500. Another input mechanism may be the touch screen LCD 1530, which may also display text and/or graphics to the user. The touch screen LCD controller 1532 couples the DSP 1502 to the touch screen LCD 1530. The GPS receiver 1538 is coupled to the DSP 1502 to decode global positioning system signals, thereby enabling the mobile device 1500 to determine its position.

Sensor 1540 couples to the DSP 1502 via the interface 1518 to provide a mechanism to determine movement and/or relative orientation of the mobile device 1500. The sensor 1540 may provide information to DSP 1502 indicating the orientation that the mobile device 1500 is being held (e.g., face up, face down, face perpendicular to the ground). Sensor 1540 may also provide information indicating whether the mobile device 1500 is being moved (e.g., right to left, up to down) and indicate sudden accelerations and/or decelerations. Sudden decelerations may indicate that the mobile device 1500 has been dropped. Sensor 1540 may include an accelerometer to measure various motions and orientations of the mobile device 1500. Measurements from sensor 1540 may be provided to DSP 1502 which may record the measurement and a time stamp in a log file stored, for example, in memory 1504.

In an embodiment, sensor 1540 may include other sensors, such as, for example, a temperature sensor and/or a current meter for measuring current flow from the mobile device's 1500 battery. The temperature sensor may detect the temperature of the mobile device 1500 or various components of the mobile device 1500 to indicate whether a component (e.g., an RF circuit) may be over heating. Additionally, in an embodiment, the mobile device 1500 may comprise other sensors that provide other functionality.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for determining a path for a user of a mobile device for traveling from an origination location to a destination location, comprising:
   receiving, via a user input of the mobile device, a request for a recommended path between the origination location to the destination location, wherein the request comprises the origination location, the destination location, an optimization objective, and a user specified network quality constraint indicating a minimum acceptable network quality along the recommended path between the origination location and the destination location;
   receiving, via a receiver of the mobile device, network access point information for access points between the origination location and the destination location; and
   generating, with a processor of the mobile device, the recommended path from the origination location to the destination location that meets the minimum acceptable network quality as specified by the user specified network quality constraint based on the request and the network access point information,
   wherein the optimization objective comprises a path with one of a maximized bandwidth, a maximized time with a preferred connection type, a minimized data packet loss rate, a minimized network latency, a minimized allowable jitter, a shortest travel distance, a quickest travel time, a maximized use of a preferred road type, a minimized use of an undesirable road type, a specified desirable location that is included, and a specified undesirable location that is excluded, and
   wherein the user specified network quality comprises at least one of a minimum allowable network bandwidth, a maximum allowable network latency, a maximum allowable packet loss rate, and a maximum allowable jitter.

2. The method of claim 1, wherein generating the recommended path comprises generating a plurality of paths that satisfy the user specified network quality constraint, and wherein the recommended path is one of the generated paths.

3. The method of claim 1, wherein the request further comprises a travel constraint, wherein the travel constraint comprises a maximum percentage increase in travel time from a shortest travel time that is acceptable for a minimum percentage increase in network performance.

4. An apparatus for generating at least one recommended path for a user of a mobile device to travel from an origination point to a destination point, comprising:
   an interface configured to receive a request for the at least one recommended path from the user, wherein the request comprises the origination point, the destination point, an optimization objective, and a user constraint;
   a receiver configured to receive network accessibility information; and
   a processor coupled to the interface and the receiver and configured to determine the at least one recommended path based on the user constraint and the network accessibility information,
   wherein the interface is further configured to indicate to the user a network quality parameter that indicates average wireless data communication throughput of active data services along the at least one recommended path,
   wherein the optimization objective comprises a path with one of a maximized bandwidth, a maximized time with a preferred connection type, a minimized data packet loss rate, a minimized network latency, a minimized allowable jitter, a shortest travel distance, a quickest travel time, a maximized use of a preferred road type, a minimized use of an undesirable road type, a specified desirable location that is included, and a specified undesirable location that is excluded, and
   wherein the user constraint comprises a network accessibility constraint, and
   wherein the network accessibility constraint comprises at least one of a minimum allowable network bandwidth, a maximum allowable network latency, a maximum allowable packet loss rate, and a maximum allowable jitter.

5. The apparatus of claim 4, wherein the receiver is further configured to receive dynamically updated network accessibility information while the user is navigating from the origination point to the destination point, and wherein the processor is further configured to determine an updated recommended path based on the dynamically updated network accessibility information.

6. The apparatus of claim 4, wherein the user constraint further comprises a minimum allowable amount that a network accessibility of a prospective path that is not one of a shortest path and a quickest path must exceed to be selected as the recommended path.

7. The apparatus of claim 4, wherein the user constraint comprises a minimum allowable level of network accessibility.

8. The apparatus of claim 4, wherein the apparatus is one of the mobile device and a server.

9. A system for generating at least one recommended path for a user of a mobile device to travel from an origination point to a destination point, comprising:
   a wireless network;
   a user interface configured to receive a request for a recommended path from a user, wherein the request comprises the origination point, the destination point, and a constraint;

- a receiver configured to receive network accessibility information from the wireless network; and
- a processor coupled to the user interface and the receiver and configured to determine the at least one recommended path based on the constraint and the network accessibility information, wherein the constraint comprises at least one of an optimization objective, a travel constraint, and a network accessibility constraint, and wherein the optimization objective comprises a path with one of a maximized bandwidth, a maximized time with a preferred connection type, a minimized data packet loss rate, a minimized network latency, a minimized jitter, a shortest travel distance, a quickest travel time, a maximized use of a preferred road type, minimized use of an undesirable road type, a specified desirable location included, and a specified undesirable location that is excluded, and wherein the network accessibility constraint comprises at least one of a minimum allowable network bandwidth, a maximum allowable network latency, a maximum allowable packet loss rate, and a maximum allowable jitter.

\* \* \* \* \*